United States Patent [19]
Simon

[11] Patent Number: 6,085,694
[45] Date of Patent: Jul. 11, 2000

[54] SINGLE STRAP STRAIN REDUCING DOG HARNESS

[75] Inventor: Allen Simon, East Northport, N.Y.

[73] Assignee: Four Paws Products, Ltd., Hauppauge, N.Y.

[21] Appl. No.: 09/247,478

[22] Filed: Feb. 9, 1999

Related U.S. Application Data

[63] Continuation-in-part of application No. 09/060,013, Apr. 14, 1998, abandoned.

[51] Int. Cl.[7] .................................................. A01K 27/00
[52] U.S. Cl. ......................... 119/792; 119/856; 119/863; 119/797; 119/907
[58] Field of Search .................................. 119/792, 793, 119/795, 797, 856, 864, 865, 907, 863; 24/115 G

[56] References Cited

U.S. PATENT DOCUMENTS

| | | |
|---|---|---|
| 1,906,043 | 4/1933 | Bernstein . |
| 2,187,021 | 1/1940 | Everson . |
| 2,233,397 | 3/1941 | Bloom . |
| 2,464,867 | 3/1949 | Johnson . |
| 2,670,712 | 3/1954 | Patience et al. . |
| 2,758,769 | 8/1956 | Nunn . |
| 2,778,335 | 1/1957 | Hirsch . |
| 2,956,541 | 10/1960 | Rall . |
| 2,998,008 | 8/1961 | Klesa . |
| 3,435,867 | 4/1969 | Hyden . |
| 3,709,491 | 1/1973 | Minchin ................................ 273/58 C |
| 3,769,939 | 11/1973 | Wais et al. ............................... 119/106 |
| 4,570,424 | 2/1986 | Simpson ...................................... 54/23 |
| 4,794,673 | 1/1989 | Yamaguchi ............................ 24/115 G |
| 4,964,369 | 10/1990 | Sporn ......................................... 119/96 |
| 5,125,219 | 6/1992 | Sligo .......................................... 54/23 |
| 5,134,836 | 8/1992 | Harty .......................................... 54/23 |
| 5,150,667 | 9/1992 | Salidrigas ................................... 119/96 |
| 5,172,428 | 12/1992 | Leinofff ....................................... 2/181 |
| 5,325,819 | 7/1994 | Krauss ...................................... 119/792 |
| 5,329,885 | 7/1994 | Sporn ........................................ 119/864 |
| 5,335,627 | 8/1994 | Bandimere ............................... 119/856 |
| 5,359,964 | 11/1994 | Sporn ........................................ 119/864 |
| 5,370,083 | 12/1994 | Sporn ........................................ 119/864 |
| 5,471,953 | 12/1995 | Sporn ........................................ 119/792 |
| 5,485,810 | 1/1996 | Sporn ........................................ 119/792 |
| 5,713,308 | 2/1998 | Holt, Jr. .................................... 119/856 |
| 5,743,216 | 4/1998 | Holt, Jr. .................................... 119/793 |
| 5,920,963 | 7/1999 | Chou .......................................... 24/170 |

FOREIGN PATENT DOCUMENTS

| | | | |
|---|---|---|---|
| 2142206 | 1/1973 | France | ................................. 119/907 |

*Primary Examiner*—Peter M. Poon
*Assistant Examiner*—Son T. Nguyen
*Attorney, Agent, or Firm*—Darby & Darby

[57] ABSTRACT

A strain reducing dog harness which comprises a single strap including a movable member disposed relative to the strap to define a single body loop of variable size. The strap is sized and arranged such that when mounted on the dog, the single body loop includes left and right strap portions which extend forwardly from the dog's shoulders, downwardly over the dog's chest, rearwardly under the respective left and right foreleg pits, and upwardly behind the dog's forelegs and over the dog's back. When the dog strains against a leash attached to the harness, a distributed pressure is applied to the chest, foreleg pits and back, to encourage the dog to relax to decrease the pressure. In another embodiment a single strap includes a first movable member and a second movable member which define a body loop and a neck loop. The strap is sized and arranged such that when mounted on the dog, left and right strap portions extend forwardly from the dog's shoulders and downwardly over the dog's chest to the second movable member over the dog's chest to define a neck loop between the second movable member and the first movable member, and a body loop with the strap portions extending rearwardly under the respective left and right foreleg pits, and upwardly behind the dog's forelegs and over the dog's back.

16 Claims, 9 Drawing Sheets

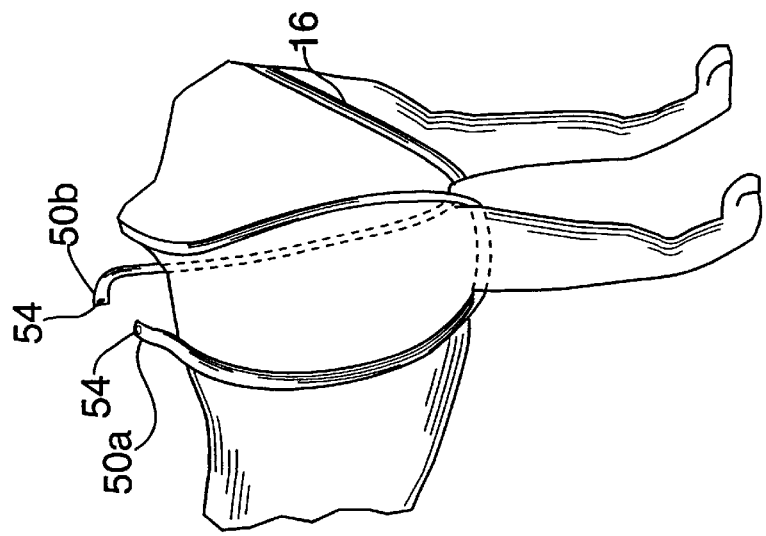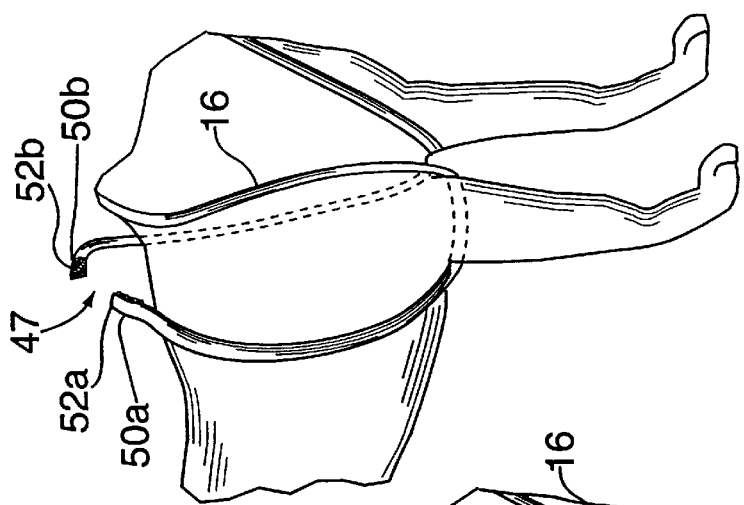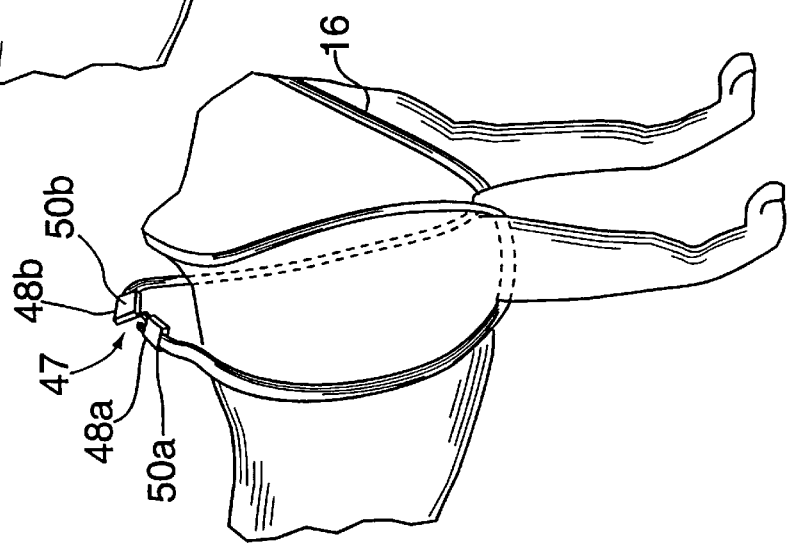

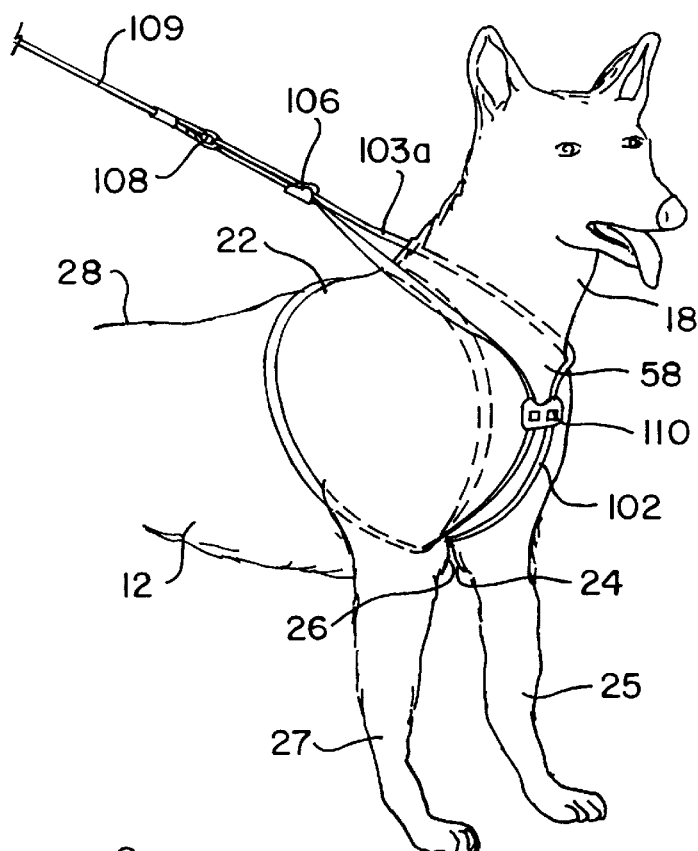
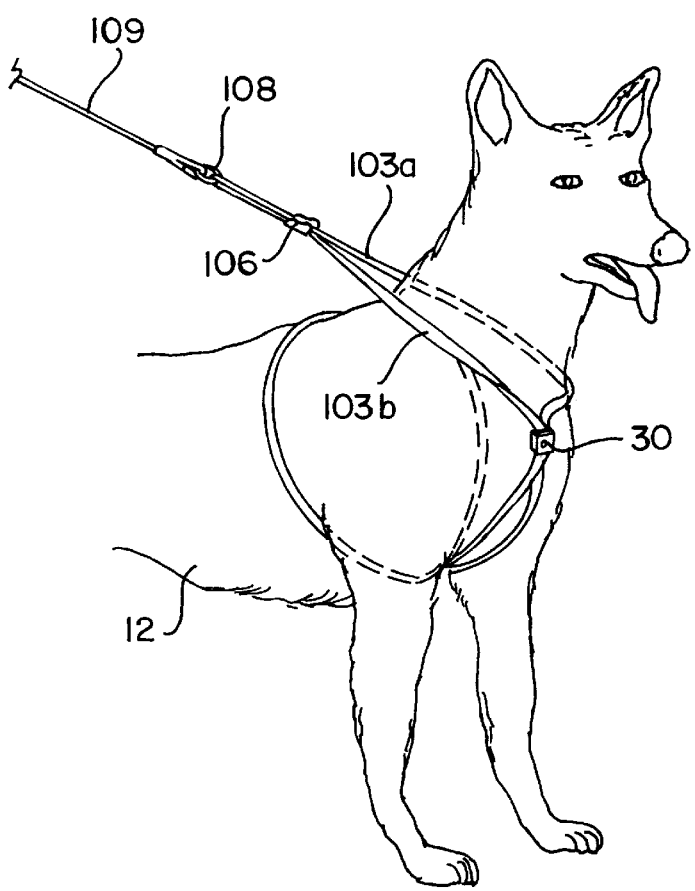

SINGLE STRAP STRAIN REDUCING DOG HARNESS

This application is a continuation-in-part of U.S. application Ser. No. 09/060,013, filed on Apr. 14, 1998 now abandoned.

BACKGROUND

1. Field of the Invention

The present invention relates generally to a dog harness, and more particularly, to a dog harness formed from a single strap adapted to induce the dog to cease straining against a leash coupled to the harness.

2. Description of the Prior Art

There are a variety of restraint devices for controlling dogs known in the art.

A hobble-type restraint harness is disclosed in U.S. Pat. No. 2,670,712 to Patience et al. The hobble-type harness includes a conventional collar and a shoulder strap having hoops at opposite ends that loosely fit over the forelegs of the dog. The hobble-type harness generally permits free movement of the animal. However, when the dog attempts to strain against the leash, a physical restraint on the forelegs is applied by upwardly drawn foreleg hoops. This expedient has disadvantages because the hobble-type harness provides a physical restraint on the forelegs. Thus, its effectiveness is dependent upon the strength of the dog and the master in control.

Everson U.S. Pat. No. 2,187,021 discloses a dog harness comprising a single strap which, when fitted on a dog, defines a neck encircling loop and a body encircling loop behind the front legs. The loops are joined at a common juncture point which overlies the dog's chest. A leash coupled to a buckle disposed at the top of the body loop as shown in FIG. 2, or to the neck loop as described in the specification. A rearward pull on the body loop causes a portion of the neck loop to tightly engage the dog's neck and pull it down. Conversely, if the leash is coupled to the neck loop, a rearward pull causes a portion of the body loop to engage the dog's back and chest.

Another harness design for inducing the dog to stop straining against the leash by applying concentrated pressure only to the sensitive foreleg pits is disclosed in Sporn U.S. Pat. No. 4,964,369. The Sporn '369 Patent discloses a dog harness having a pair of cables that extend through slip rings centrally located on a collar disposed around the neck of the dog in a region between the dog's shoulders, under the foreleg pits from behind the front legs, and forwardly to a second pair of rings disposed on the front of the collar. The cables are coupled to a standard dog leash. In this manner, when the dog strains against the leash, the tension between the leash and the dog causes the cables to apply direct pressure to the foreleg pits. This arrangement has a disadvantage in that excessive concentrated pressure on the foreleg pits can be painful for the animal.

Sporn U.S. Pat. Nos. 5,329,885, 5,359,964, 5,370,083, 5,471,953, 5,485,810, 5,611,298, 5,660,146, and 5,676,093, disclose strain-reducing dog harnesses which comprise pairs of loops that depend from a leash coupling junction at which the loops are joined. The loops are angled at the junction and cross over each other at a crossover site located on the chest of the dog when the harness is installed. The coupling junction overlies the dog's shoulder between the right and left forelegs, and the crossover site is disposed with respect to the dog's chest such that one loop runs through the crotch between the chest and the left foreleg and back to the junction, and the other loop runs through the crotch between the chest and right foreleg and back to the junction. When the dog strains against the leash, the harness loops then ride up into the sensitive foreleg pits and impose pressure which induces the dog to cease straining against a leash coupled to the harness. Like the harness disclosed in the Sporn '369 Patent, pressure is concentrated only on the foreleg pits.

Other harnesses which apply painful pressure to the foreleg pits of an animal are shown in McFarland U.S. Pat. No. 5,682,840 and Knauss U.S. Pat. No. 5,325,819.

Bandimere U.S. Pat. No. 5,335,627 discloses an animal harness configured as a block and tackle which causes a pulling force from the animal to exert a restraining force across the upper foreleg muscles. The harness includes a plurality of straps and slip rings to form movable slip loops which provide a mechanical advantage as the animal strains against a leash coupled to the harness. The straps are connected to a slotted plate which rests on the back of the animal rearwardly of its shoulders. The straps extend under the foreleg muscles, as opposed to the foreleg pits, and, in combination with the plate, provide a distributed pressure to restrain the animal without applying painful pressure to the sensitive foreleg pits. The Bandimere arrangement actually functions in a manner akin to a hobble-type harness, but where excessive pulling forces by the dog are resisted by the block and tackle mechanism to make it easier for a weaker person to control a large dog.

In view of the foregoing, there exists a need for an improved strain-reducing dog harness which provides a distributed pressure to induce the dog to stop straining against a leash coupled to the harness.

SUMMARY OF THE INVENTION

It is an object of the present invention to provide a strain reducing dog harness formed from a single strap, which can be used with or without a dog collar.

It is another object of the present invention to provide a single strap strain reducing dog harness which can apply a distributed pressure to the foreleg pits and back of the dog to induce the dog to cease straining against a leash coupled to the harness.

It is still another object of the present invention to provide a single strap strain reducing dog harness which applies a distributed pressure over the back of the dog to avoid causing the dog to suffer pain and to reduce the risk of injury.

It is yet another object of the present invention to provide a single strap strain reducing dog harness which includes a coupling member which can be adjustably disposed over the chest of the dog to permit the master to adjust the distribution of restraining pressure when the dog strains against the leash.

It is another object of the present invention to provide a single strap strain reducing dog harness which does not require multiple straps or cables, and slip rings to function.

It is yet another object of the present invention to provide a single strap strain reducing dog harness which is simple in design and economical to manufacture.

In accordance with the above objects and additional objects that will become apparent hereinafter, the present invention provides a strain reducing dog harness which is attachable to a leash for a dog having a body including shoulders, a chest, forelegs, foreleg pits, and a back. The harness comprises a single strap including a movable member disposed relative to the strap to define a single body loop of variable size. The strap is sized and arranged such that when mounted on the dog, the single body loop includes left and right strap portions which extend forwardly from the dog's shoulders, downwardly over the dog's chest, rearwardly under the respective left and right foreleg pits, and upwardly behind the dog's forelegs and over the dog's back. When the dog strains against a leash attached to the harness, a distributed pressure is applied to the chest, foreleg pits and back, to encourage the dog to relax to decrease the pressure.

In another embodiment, the present invention provides a strain reducing dog harness which comprises a single strap including a first movable member and a second movable member which define a body loop and a neck loop. The strap is sized and arranged such that when mounted on the dog, left and right strap portions extend forwardly from the dog's shoulders and downwardly over the dog's chest to the second movable member over the dog's chest to define a neck loop between the second movable member and the first movable member, and a body loop with the strap portions extending rearwardly under the respective left and right foreleg pits, and upwardly behind the dog's forelegs and over the dog's back. When the dog strains against a leash attached to the harness, a distributed pressure is applied to the chest, foreleg pits and back, to encourage the dog to relax to decrease the pressure.

In another embodiment, the present invention provides a strain reducing dog harness adapted for use with a collar having a slip ring disposed at a location along the collar which overlies a central portion of the dog's neck when being worn by the animal. In one embodiment, the dog harness comprises a strap defining a single body loop sized and arranged such that when mounted on the dog, the strap is passed through the collar slip ring and split into left and right strap portions which extend forwardly from the dog's shoulders, downwardly over the dog's chest, rearwardly under the respective left and right foreleg pits, and upwardly behind the dog's forelegs and over the dog's back. When the dog strains against the strap, a distributed pressure is applied to the chest, foreleg pits and back to encourage the dog to relax to decrease the pressure. In an alternative embodiment, the strap is passed through a sleeve or coupling member disposed along the strap, which is located on the chest of the dog to pull the respective split components forwardly of the dog's legs to thereby exert a distributed pressure on the chest.

BRIEF DESCRIPTION OF THE DRAWINGS

In accordance with the above, the present invention will now be described in detail with particular reference to the accompanying drawings.

FIG. 4a is a sectional view taken along lines 4a—4a in FIG. 3a;

FIG. 5a is a detail view of an alternative strap arrangement with a strap release coupling in a first embodiment;

FIG. 5b is a detail view of a second embodiment of a strap release coupling;

FIG. 5c is a detail view of a third embodiment of a strap release coupling;

FIG. 11 is an isometric view of a dog wearing the harness of FIG. 8 having the chest junction shown in FIG. 10;

FIG. 12 is an isometric view of a dog wearing the harness of FIG. 8 having a push-button clip for a chest junction.

DETAILED DESCRIPTION OF THE PREFERRED EMBODIMENTS

Figure 1:
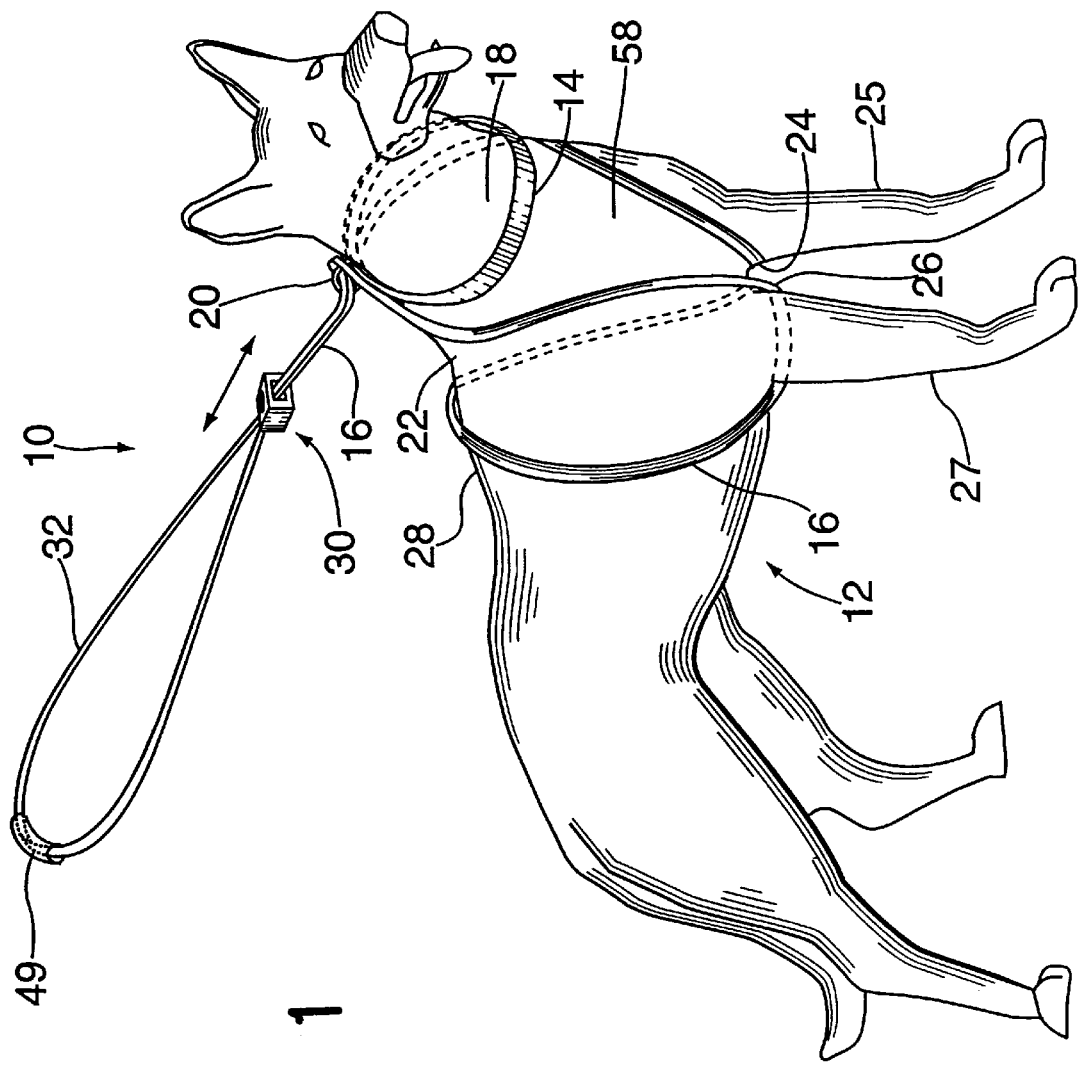
FIG. 1 is an isometric view of a dog wearing a dog harness in accordance with the present invention.
Figure 2:
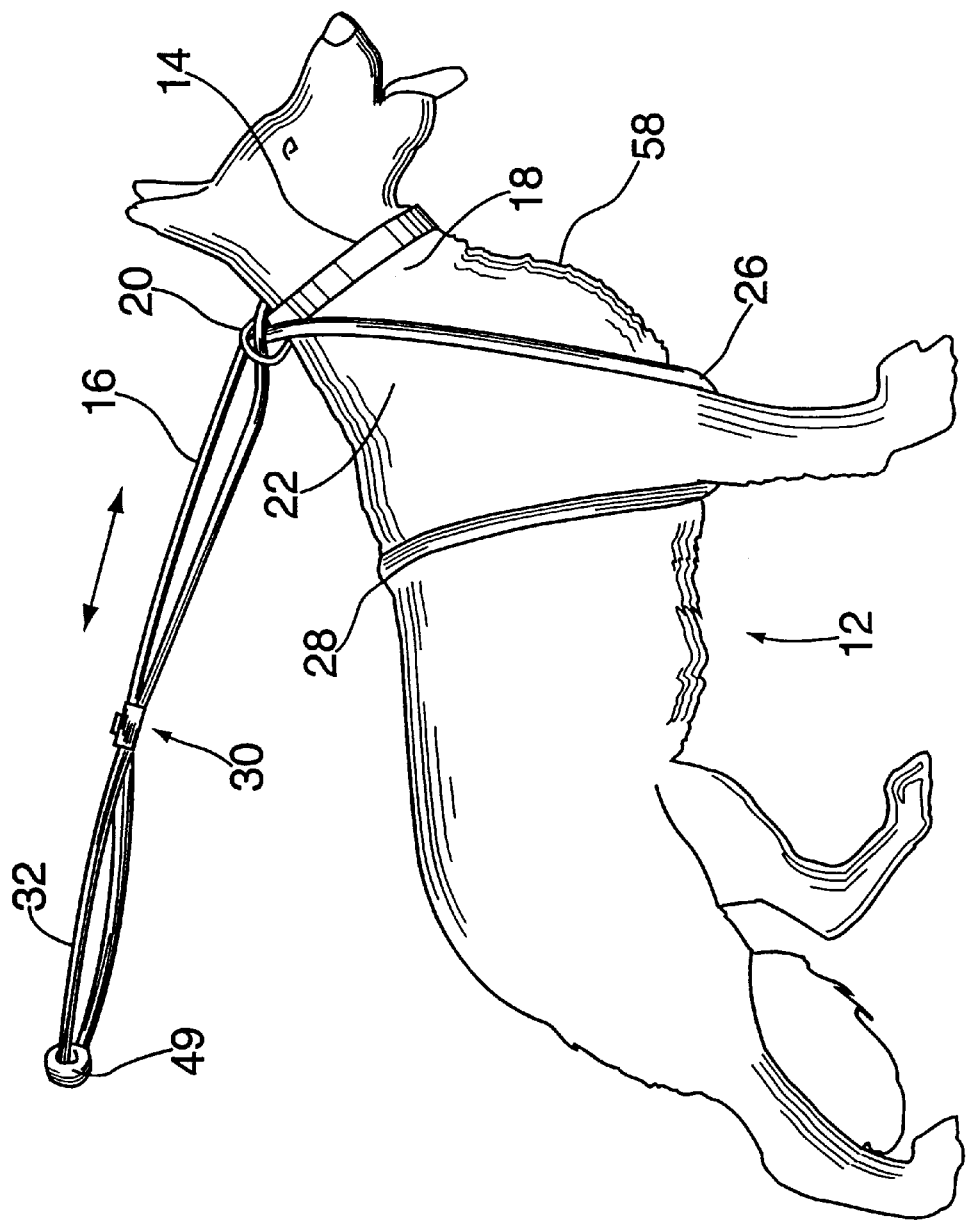
FIG. 2 is a side elevational view thereof.

Referring to the several views of the drawings, there is shown a single strap strain reducing dog harness 10 for a dog 12 or other small animal. FIGS. 1–7 illustrate an embodiment for use with a collar 14. The harness 10 comprises a strap 16 forming a single body loop when placed on the dog 12. The strap 16 may have a circular or flat/rectangular cross section, and is constructed from materials of the type commonly used for manufacturing dog harness components. The collar 14 may be any conventional dog collar adapted for encircling the neck 18 of the dog 12. In accordance with the present invention, collar 14 includes a slip ring 20 disposed at a location along collar 14 such that it overlies a central portion of the neck 18 of the dog 12 when being worn as shown in FIGS. 1 and 2. The slip ring 20 is connected to collar 14 in a conventional manner, such as, for example, by looping a portion of the collar material around slip ring 20, and stitching or riveting the material loop. The slip ring 20 is sized to permit strap 16, when doubled as shown, to pass freely therethrough.

The strap 16 is split to extend downwardly in left and right strap portions from the dog's shoulders 22, under the respective left and right foreleg pits 24,26, from the front of the dog's legs 25,27, and upwardly from the foreleg pits 24, 26 and over the back 28 of the dog 12. Thus, strap 16 follows a continuous uninterrupted path around the dog, i.e., a "single loop." This arrangement greatly simplifies fabrication and provides a harness which is economical to manufacture. It also allows for a uniform distribution of pressure on the dog when it strains against strap 16.

Figure 3A:
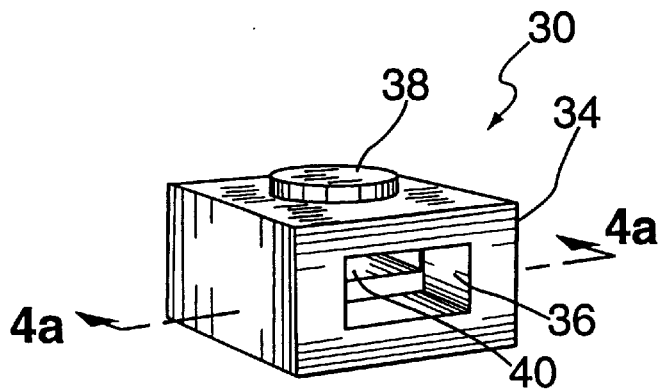
FIG. 3a is an isometric view of a clip for adjusting the size of a handle formed by the strap of the harness.
Figure 3B:
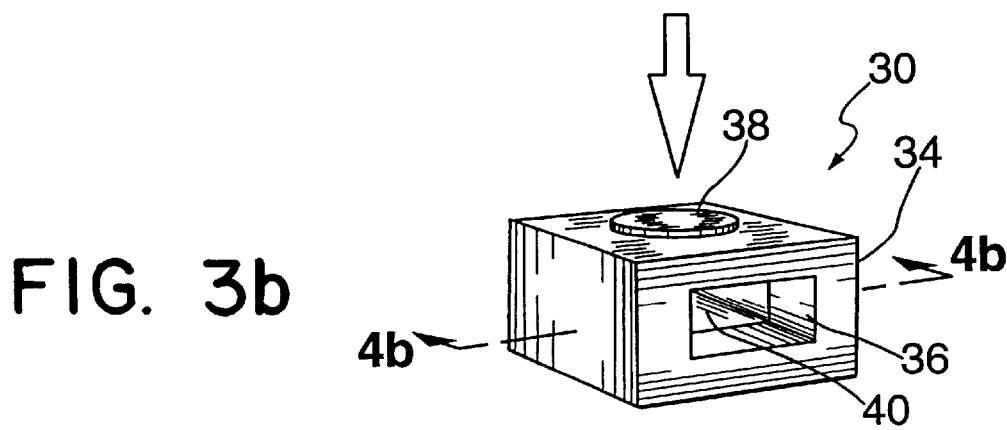
FIG. 3b is an isometric view of the clip with the strap release button depressed.
Figure 4A:
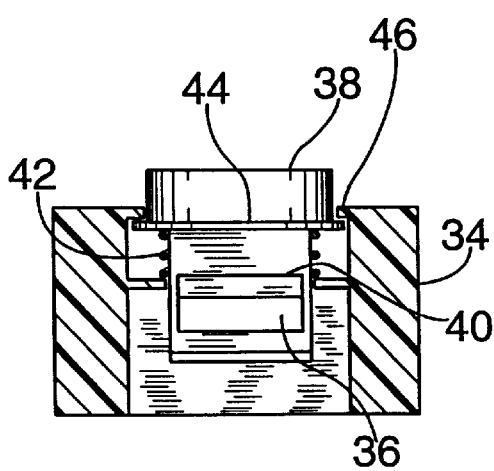
Figure 4B:
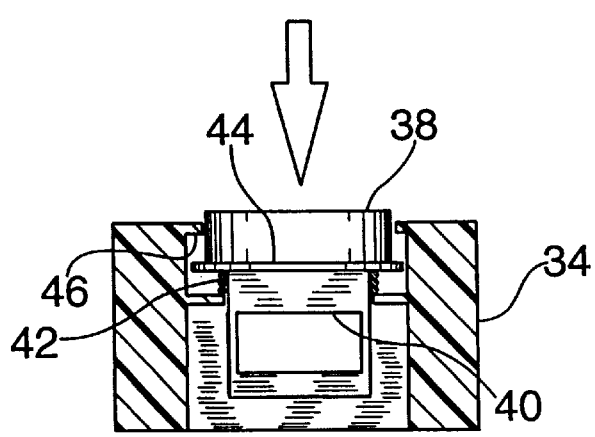
FIG. 4b is a sectional view taken along lines 4b—4b in FIG. 3b.

As an option, a clip 30 may be provided for defining a handle in the form of an adjustable loop 32 on strap 16 when installed on the dog 12. In the illustrative embodiment shown in FIGS. 3a, 3b, 4a and 4b, clip 30 includes a body 34 defining a central aperture 36 therethrough. A spring loaded pin 38 having an aperture 40 is normally biased by spring 42 into a position with aperture 40 disposed in a non-aligned orientation (FIGS. 3a and 4a) with aperture 36 in the body 34. A compression spring 42 urges pin 38 into the normally non-aligned position. To prevent pin 38 from falling out of body 34, a flange 44 is provided on pin 38 for engaging a complementary lip 46 associated with body 34. The strap 16 is doubled and passed through the respective apertures 36, 40 in body 34 and pin 38 such that the non-aligned orientation places pressure on strap 16 and thereby normally prevents movement of clip 30 relative to strap 16. If the user desires to adjust the size of the loop 32, he or she simply depresses the pin 38 until the apertures 36, 40 are brought into sufficient alignment (FIG. 3b and 4b). This action will release the strap components and allow the clip 30 to be moved slidably along the strap 16 as shown by the arrows in FIGS. 1 and 2 to either shorten or lengthen the size of handle loop 32. In addition to providing for adjusting the size of the handle loop 32, the clip 30 prevents the strap 16 from falling through the slip ring 20 on collar 14. If desired, a permanent clip may be provided in lieu of the slidable clip 30 to define a handle loop 32 of a single size.

To provide a comfortable grasping surface for a person controlling the dog 12 with harness 10, a tubular sleeve 49 may be provided over strap 16 in the handle loop region 32 as shown in FIGS. 1 and 2. The sleeve 49 can be manufactured from a variety of different materials, including smooth fabrics, foam, wool, and the like. If desired, the sleeve can be constructed with an inner liner that provides a low friction surface for strap 16 to move through, or it can be permanently anchored to the strap in the handle loop region.

The strap 16 can be used with any existing dog collar that has a slip ring located in the rear central region of the dog's neck. The strap 16 is installed by doubling the single loop and passing the respective strap components through the slip ring 20, over the dog's shoulders 22 and under the respective left and right foreleg pits 24,26 and thence over the dog's back 28. When the dog 12 attempts to strain against strap 16 when the strap is held by the dog's master, a distributed pressure is applied on the dog's chest 58, foreleg pits 24,26 and back 28, which will encourage the dog 12 to relax to relieve the pressure. By distributing the load, harness 10 provides an advantage over prior art harnesses that only apply painful pressure to the foreleg pits.

Figure 6:
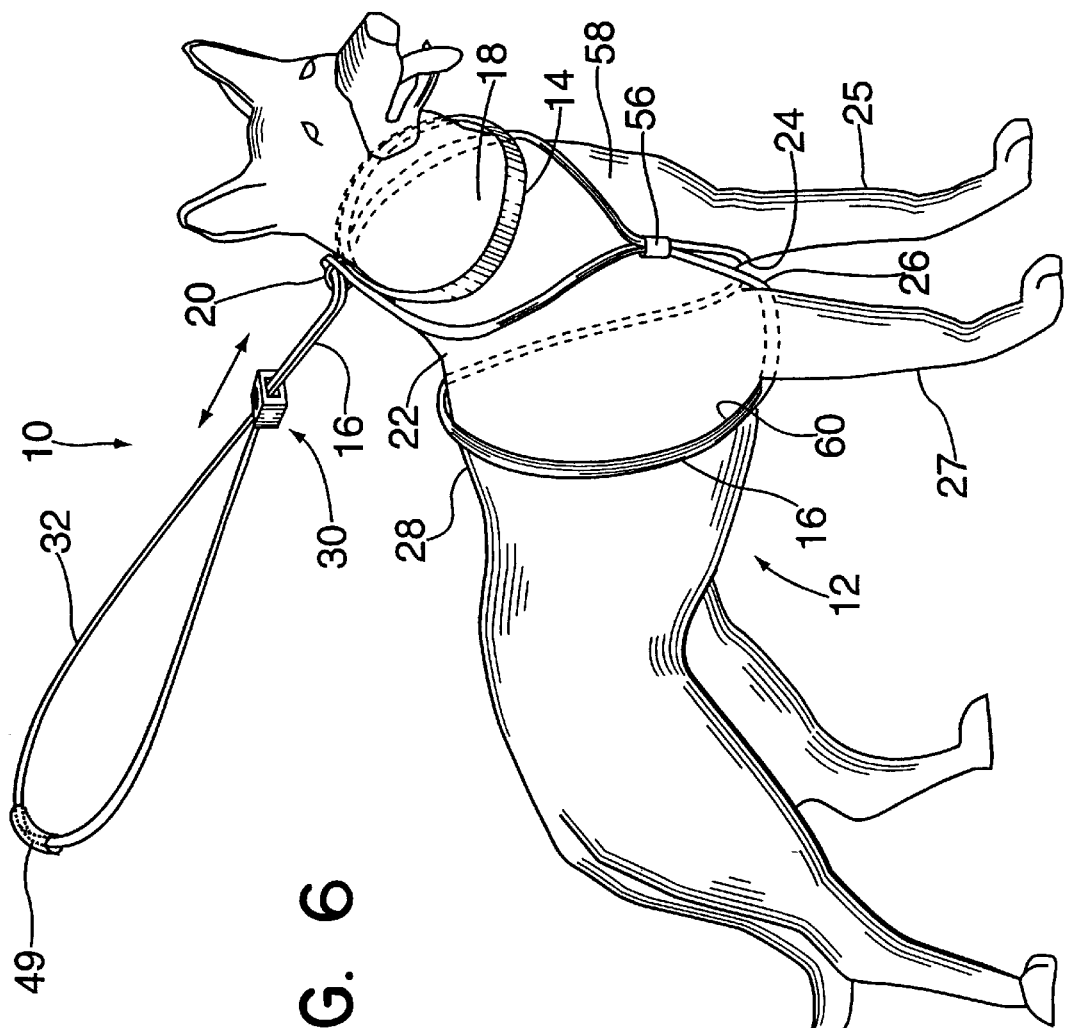
FIG. 6 is an alternative embodiment of the harness shown in FIGS. 1 and 2, having an adjustable chest junction.
Figure 7:
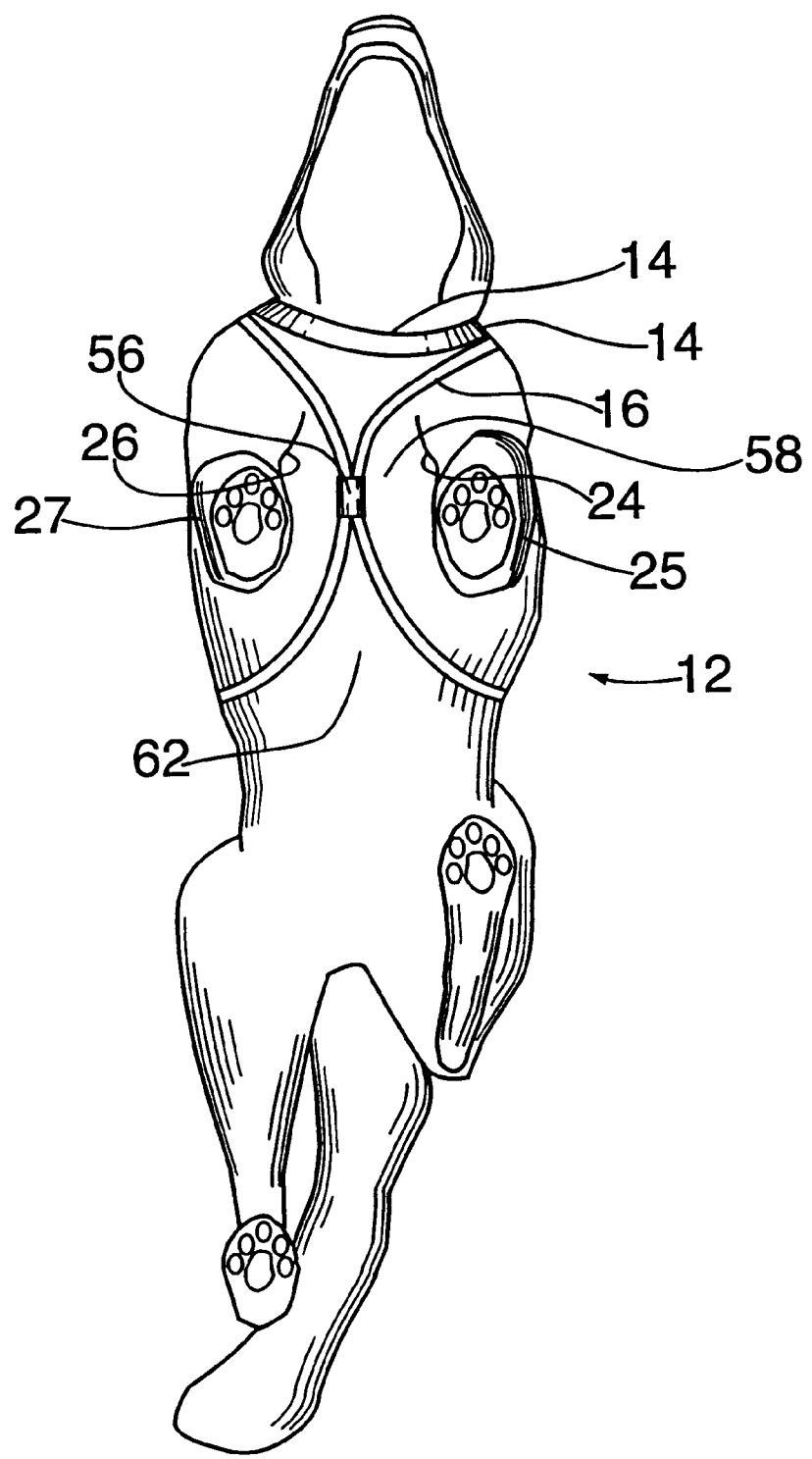
FIG. 7 is a bottom view of the dog's belly showing the harness of FIG. 6 with the sleeve disposed over the lower portion of the dog's chest.

In an alternative embodiment depicted in FIG. 6, an adjustable tubular sleeve 56 is provided for coupling the strap 16 over the dog's chest 58 as shown. In this manner, a distributed pressure is also applied across the chest 58 when the dog 12 strains against the strap 16. As in the first embodiment, this arrangement provides a positive means of control while ensuring that the dog is not subjected to excessive discomfort. The tubular sleeve 56 can be fabricated from any lightweight flexible plastic material having physical characteristics compatible for use with animals. The sleeve 56 is installed on the strap 16 by simply doubling the strap 16 and sliding the doubled strap 16 through the sleeve 56 to form a single end loop 60. When installed on the dog 12, a body loop 60 is defined by the split strap 16 passing under the foreleg pits 24, 26 and over the back 28 of the dog 12. If the sleeve 56 is slid relative to the strap 16 to a location further down along the chest 58 towards the bottom 62 of the dog 12, the strap 16 is pulled inwardly away from the foreleg pits 24, 26 towards a location intermediate left foreleg 25 and right foreleg 27 as shown in FIG. 7. In this orientation, the strap 16 does not exert any pressure on the foreleg pits 24, 26 when the dog strains against the strap 16. Consequently, all of the restraining pressure is applied in a distributed manner to the chest 58 and the back 28 of the dog 12.

In an alternative embodiment shown in FIGS. 5a, 5b and 5c, the strap 16 includes a fastener generally characterized by the reference numeral 47 to facilitate easier installation of the strap 16 on the dog 12. In the exemplary embodiment shown in FIG. 5a, the fastener 47 consists of a buckle including complementary quick-release coupling elements 48a, 48b, of the type well known in the art. Each coupling element 48a, 48b is connected to a respective end 50a, 50b of the strap 16 by stitching, rivets or the like. Alternatively, as shown in FIG. 5b, ends 48a, 48b of the strap 16 may be provided with patches of hook and loop material 52a, 52b for overlapping engagement. In yet another embodiment depicted in FIG. 5c, a standard snap 54 may be used to releasably couple the ends 50a, 50b of strap 16. These embodiments are merely exemplary, as any type of quick-release coupling can be used within the scope of the invention.

Figure 8:
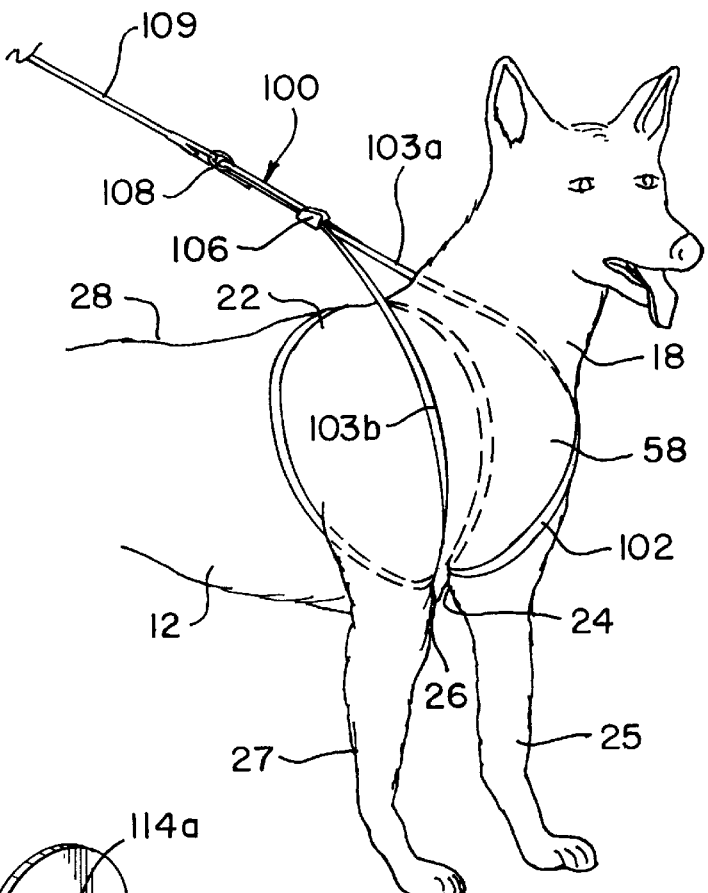
FIG. 8 is an isometric view of a dog wearing a harness in accordance with another embodiment of the harness.
Figure 9:
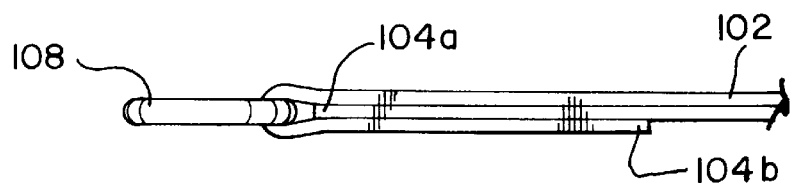
FIG. 9 is a detail view of one end of the harness at which a ring for mounting a dog leash is attached.
Figure 13:
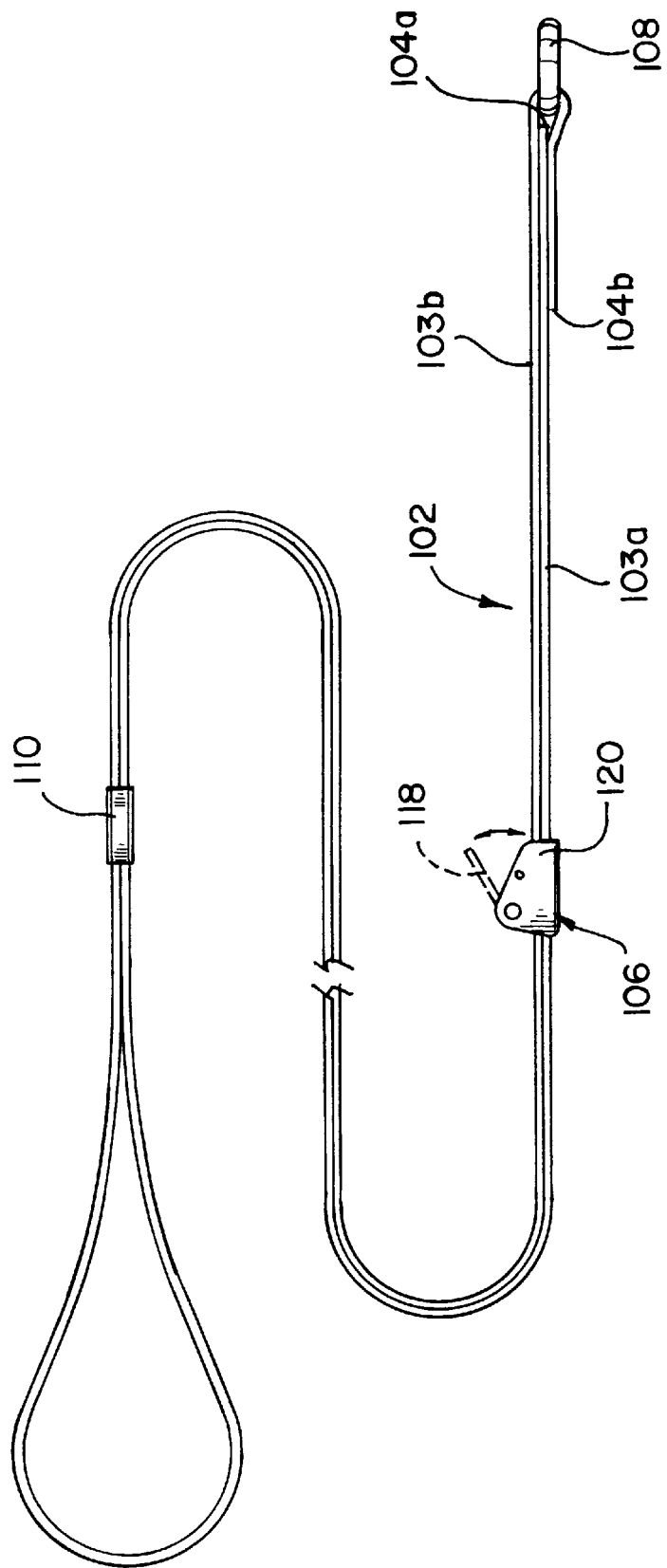
FIG. 13 is a top view of a single strap harness removed from a dog.

Referring now to FIGS. 8 and 9, there is shown another embodiment of the invention which is not used in combination with a collar. Specifically, the harness 100 comprises a single strap 102 joined at or near respective ends 104a, 104b. The strap 100 includes a movable member 106 disposed relative to the strap 100 to define a single body loop of variable size and having a loop termination point at the far end of the body loop relative to the movable member 106. The strap 100 is sized and arranged such that when mounted on the dog 12, the single body loop includes left and right strap portions 103a, 103b, which extend forwardly from the dog's shoulders 22, downwardly over the dog's chest 58, rearwardly under the respective left and right foreleg pits 24, 26, and upwardly behind the dog's forelegs 27,25 and over the dog's back 28. The ends 104a, 104b are joined together in a conventional manner around a ring or the like 108. A leash 109 is removably attached to the harness 100 at ring 108. The harness 100 is mounted by looping the strap 100 over the back 28 and underneath the dog 12, then pulling the strap forwardly between the forelegs 25,27, over the dog's head, and around the dog's neck 18. The movable member 106 is then slid forwardly toward the back of the dog's neck 18. When the dog strains against the leash 109, a distributed pressure is applied to the chest 58, foreleg pits 24, 26 and back 28, to encourage the dog 12 to relax to decrease the pressure.

As will be readily apparent upon considering the harness as shown, e.g., in FIG. 8, the pressure applied to the chest will be generally backwards, the pressure to the foreleg pits will be generally upwards, and the pressure on the back will be generally downwards.

In another embodiment depicted in FIG. 11, a single strap 100 includes a first movable member 106 and a second movable member 110 which define a body loop and a neck loop. The strap 102 is sized and arranged such that when mounted on the dog 12, the neck loop includes left and right strap portions 103a, 103b which extend forwardly from the dog's shoulders 22, and downwardly to the second movable member 110 over the dog's chest 58 thereby defining a neck loop between the second movable member 110 and the first movable member 106. A body loop is formed by the strap portions 103a, 103b extending rearwardly from the second movable member 110 under the respective left and right foreleg pits 24, 26, and upwardly behind the dog's forelegs 25, 27, and over the dog's back 28. The ends 104a, 104b are joined together at or near ring 108 as described above to permit a leash 109 to be attached to the harness 100. It is to be understood that the ring 108 need not be attached to the strap 102 where the strap ends 104a, 104b are joined. It is possible to join the ends 104a, 104b at another location, and to fasten the ring 108 to the strap 102 by alternative means, such as by stitching or the like. The depicted embodiment is merely exemplary. Furthermore, it will be appreciated that a leash 109 can be used with the embodiment using a collar of FIGS. 1–7 by providing a ring 108 or like attachment structure on the strap designated as 16 in that embodiment.

Figure 10:
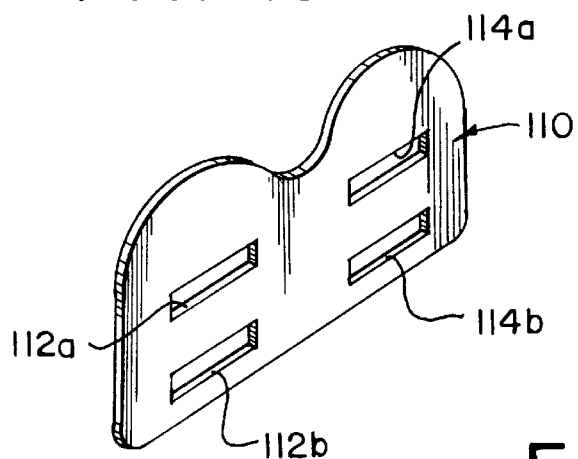
FIG. 10 is an isometric view of a planar chest junction.

The second movable member 110 shown in FIGS. 10 and 11 is a generally planar element having pairs of apertures or slots 112*a*, 112*b* and 114*a*, 114*b* defined therethrough. The strap portions 103*a*, 103*b* are respectively inserted through apertures 112*a*, 112*b* and 114*a*, 114*b* before the ends 104*a*, 104*b* are joined at or near ring 108. The second movable member 110 functions as a spreader element to separate the strap portions 103*a*, 103*b* across the chest 58 of the dog 12. The second movable member 110 helps to maintain the strap portions 103*a*, 103*b* under the foreleg pits 24, 26. In an alternative embodiment, the second movable member can be a tubular sleeve 56 as depicted in FIG. 6, or a spring loaded clip 30 (see FIGS. 3*a*, 3*b*, 4*a*, 4*b*) as shown in FIG. 12. The first movable member 106 can be the spring loaded clip 30 shown in FIGS. 1 and 2 in the same installation or a latch clip as shown in FIGS. 8, 11, 12 and 13. The latch clip is depicted in greater detail in FIG. 13, and includes an element 118 which is pivotally connected to a latch housing 120. The pivotal element 118 is adapted to snap-lock against the strap elements.

The present invention has been shown and described in what are considered to be the most practical and preferred embodiments. It is anticipated, however, that departures can be made therefrom and that obvious modifications will be implemented by persons skilled in the art.

What is claimed is:

1. A strain reducing dog harness which is attachable to a leash for a dog having a body including a neck, a chest, a back, and respective left and right forelegs, foreleg pits, and sides, the harness comprising:
    a single strap including a movable member disposed relative to said strap to define a single body loop of variable size when mounted on the dog, said strap being sized and arranged such that when mounted on the dog, said movable member is disposed behind the dog's neck and said single body loop includes left and right strap portions which, beginning from the movable member, are extendable forwardly over the dog's respective left and right shoulders, downwardly over the chest, rearwardly under the respective left and right foreleg pits, upwardly behind the respective left and right forelegs and sides and over the dog's back to meet at a loop termination point behind the dog's shoulders and which is unconnected to any other portion of the harness, such that when the dog strains against a leash attached to the harness, a distributed pressure is applied, which pressure is generally backwards on the chest, upwards in foreleg pits and downwards on the back, to encourage the dog to relax to decrease the pressure.

2. The strain reducing dog harness recited in claim 1, further comprising a coupling member slidably attached to said left and right strap portions, said coupling member being located over the dog's chest when said harness is mounted on the dog, to define a body loop between said coupling member and the dog's back, and a neck loop between said coupling member and said movable member.

3. The strain reducing dog harness recited in claim 2, wherein said coupling member defines a plurality of apertures through which said left and right strap portions pass in spaced relationship over the dog's chest.

4. The strain reducing dog harness recited in claim 2, wherein said coupling member is a spring-loaded clip.

5. The strain reducing dog harness recited in claim 1, further including a ring attached to said strap for attaching the leash.

6. The strain reducing dog harness recited in claim 1, wherein said movable member is a spring-loaded clip.

7. The strain reducing dog harness recited in claim 1, wherein said movable member is a latching clip.

8. A strain reducing dog harness which is attachable to a leash for a dog having a body including a neck, a chest, a back, and respective left and right forelegs, foreleg pits, and sides, the harness comprising:
    a single strap including a first movable member and a second movable member which define a neck loop between the first and second movable members and having first left and right strap portions and a body loop between the second movable member and a loop termination point and having second left and right strap portions, the loop termination point being unconnected to any other potion of the harness, said strap being sized and arranged such that, when mounted on the dog, said first movable member is disposed behind the dog's neck and the second movable member is positioned over the dog's chest, the first left and right strap portions of the neck loop, beginning from the first movable member, are extendable forwardly over the dog's respective left and right shoulders and downwardly over the dog's chest to said second movable member, said second left and right strap portions extending from the second movable portion rearwardly under the respective left and right foreleg pits, upwardly behind the respective left and right forelegs and sides and over the dog's back to meet at the loop termination point, such that when the dog strains against a leash attached to the harness, a distributed pressure is applied, which pressure is generally backwards on the chest, upwards in the region of the foreleg pits and downwards on the back, to encourage the dog to relax to decrease the pressure.

9. The strain reducing dog harness recited in claim 8, wherein said second movable member defines a plurality of apertures through which said left and right strap portions pass in spaced relationship over the dog's chest.

10. The strain reducing dog harness recited in claim 8, further including a ring attached to said strap for attaching the leash.

11. The strain reducing dog harness recited in claim 8 wherein said first movable member is a spring-loaded clip.

12. The strain reducing dog harness recited in claim 8, wherein said first movable member is a latching clip.

13. The strain reducing dog harness recited in claim 8, wherein said second movable member is a spring-loaded clip.

14. A method for applying a strain reducing harness which is attachable to a leash to a dog having a body including a neck, a chest, a back, and respective left and right forelegs, foreleg pits, and sides, the harness comprising a single strap including a movable member disposed relative to said strap to define a body loop of adjustable size when mounted on the dog, the loop having left and right strap portions and having a loop termiation point which is unconnected to any other portion of the harness, the method comprising the step of:
    positioning the harness on the dog such that the movable member is disposed behind the dog's neck and the left and right strap portions, beginning from the movable member, are extended forwardly over the dog's respective left and right shoulders, downwardly over the chest, rearwardly under the respective left and right foreleg pits, upwardly behind the respective left and right forelegs and sides and over the dog's back to meet at the loop termination point behind the dog's shoulders;
    wherein, when the dog strains against a leash attached to the harness, a distributed pressure is applied, which pressure is generally backwards on the chest, upwards in foreleg pits and downwards on the back, to encourage the dog to relax to decrease the pressure.

15. The method of claim 14, wherein the positioning step comprises the steps of:

looping the strap over the back and underneath the dog; and pulling the strap forwardly between the forelegs, over the dog's head, and around the dog's neck.

16. The method of claim 15, further comprising the step of sliding the movable member toward the back of the dog's neck.

* * * * *